US011016812B2

(12) United States Patent
Cheng et al.

(10) Patent No.: US 11,016,812 B2
(45) Date of Patent: May 25, 2021

(54) METHOD FOR RESOURCE ALLOCATION AND TERMINAL DEVICE

(71) Applicant: Guangdong Oppo Mobile Telecommunications Corp., Ltd., Guangdong (CN)

(72) Inventors: Jie Cheng, Guangdong (CN); Yan Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 219 days.

(21) Appl. No.: 16/049,081

(22) Filed: Jul. 30, 2018

(65) Prior Publication Data

US 2019/0034236 A1    Jan. 31, 2019

(30) Foreign Application Priority Data

Jul. 31, 2017  (CN) .......................... 201710640906.3
Jul. 31, 2017  (CN) .......................... 201710642327.2

(51) Int. Cl.
*G06F 9/50*      (2006.01)

(52) U.S. Cl.
CPC ............ *G06F 9/505* (2013.01); *G06F 9/5011* (2013.01); *G06F 9/5027* (2013.01)

(58) Field of Classification Search
None
See application file for complete search history.

(56) References Cited

U.S. PATENT DOCUMENTS

2009/0293051 A1* 11/2009 Krywaniuk ............... G06F 8/63
                                                    717/173
2012/0159259 A1   6/2012 Klein et al.
2015/0067321 A1   3/2015 Baek
2015/0317189 A1  11/2015 Georgescu et al.
(Continued)

FOREIGN PATENT DOCUMENTS

CN    103049245 A    4/2013
CN    103430151 A   12/2013
(Continued)

OTHER PUBLICATIONS

International search report issued in corresponding international application No. PCT/CN2018/097514 dated Oct. 26, 2018.
(Continued)

*Primary Examiner* — Wynuel S Aquino

(57) ABSTRACT

A method for resource allocation and related products are provided. The method includes the following operations. An operating system in an operating system space of a terminal device receives a scenario data package from a target application that is currently running, where the scenario data package contains an identifier and key performance parameters of the target application that is currently running. The operating system determines a performance improvement strategy for the target application that is currently running according to the identifier and the key performance parameters. The operating system adjusts allocation of system resources for the target application that is currently running according to the performance improvement strategy.

7 Claims, 6 Drawing Sheets

(56) References Cited

U.S. PATENT DOCUMENTS

| | | | |
|---|---|---|---|
| 2015/0339171 | A1 | 11/2015 | Andonieh et al. |
| 2016/0154639 | A1* | 6/2016 | Clark ................... G06F 8/443 718/104 |
| 2017/0262304 | A1* | 9/2017 | Williams ............ G06F 11/3466 |
| 2018/0130171 | A1* | 5/2018 | Prakash ................... G06F 9/50 |
| 2018/0276047 | A1* | 9/2018 | Lo ......................... G06F 9/5011 |
| 2018/0343318 | A1* | 11/2018 | Yuan ................. H04M 1/72522 |

FOREIGN PATENT DOCUMENTS

| | | | |
|---|---|---|---|
| CN | 103685412 | A | 3/2014 |
| CN | 104731304 | A | 6/2015 |
| CN | 104991775 | A | 10/2015 |
| CN | 105159781 | A | 12/2015 |
| CN | 106020987 | A | 10/2016 |
| CN | 106095592 | A | 11/2016 |
| CN | 106104487 | A | 11/2016 |
| CN | 106201890 | A | 12/2016 |
| CN | 106549880 | A | 3/2017 |
| CN | 106775803 | A | 5/2017 |
| CN | 106874168 | A | 6/2017 |
| CN | 107426432 | A | 12/2017 |
| CN | 107479970 | A | 12/2017 |
| CN | 107479972 | A | 12/2017 |
| CN | 107483725 | A | 12/2017 |
| CN | 107528976 | A | 12/2017 |
| CN | 107577537 | A | 1/2018 |
| EP | 2466469 | A2 | 6/2012 |

OTHER PUBLICATIONS

Extended European search report issued in corresponding European application No. 18186162.6 dated Jan. 7, 2019.
Examination report issued in corresponding IN application No. 201834028440 dated Jul. 20, 2020.
English translation of the first office action issued in corresponding CN application No. 201710641499.8 dated Apr. 22, 2019.
English translation of the second office action issued in corresponding CN application No. 201710641499.8 dated Jul. 25, 2019.
English translation of Decision of rejection issued in corresponding CN application No. 201710641499.8 dated Mar. 24, 2020.
English translation of first office action issued in corresponding CN application No. 201710640906.3 dated Apr. 22, 2019.
English translation of second office action issued in corresponding CN application No. 201710640906.3 dated Jun. 27, 2019.
English translation of Notice of allowance issued in corresponding CN application No. 201710640906.3 dated Sep. 26, 2019.
English translation of first office action issued in corresponding CN application No. 201710642327.2 dated Apr. 2, 2019.
English translation of second office action issued in corresponding CN application No. 201710642327.2 dated Aug. 1, 2019.

* cited by examiner

METHOD FOR RESOURCE ALLOCATION AND TERMINAL DEVICE

CROSS-REFERENCE TO RELATED APPLICATION(S)

This application claims priority to Chinese Application No. 2017106409063, filed on Jul. 31, 2017, and Chinese Application No. 2017106423272, filed on Jul. 31, 2017, the contents of both of which are hereby incorporated by references in their entireties.

TECHNICAL FIELD

This disclosure relates to the technical field of terminal devices, and particularly to a method for resource allocation and a terminal device.

BACKGROUND

With the rapid development of technologies relating to terminal devices, an increasing number of applications are installed on mobile phones of users, such as reading APPs, payment APPs, game APPs, and music APPs. People's daily life is closely linked with the mobile phones.

SUMMARY

Implementations of the present disclosure provide a method for resource allocation and a terminal device.

According to a first aspect of the disclosure, a method for resource allocation is provided. The method includes the following operations. An operating system of a terminal device receives a scenario data package from a target application that is currently running, where the scenario data package contains an identifier and key performance parameters of the target application. The operating system determines a performance improvement strategy for the target application according to the identifier and the key performance parameters. The operating system adjusts allocation of system resources for the target application according to the performance improvement strategy.

According to a second aspect of the disclosure, a terminal device is provided. The terminal device includes at least one processor and a computer readable storage medium. The computer readable storage medium is coupled to the at least one processor and storing at least one computer executable instruction thereon which, when executed by the at least one processor, cause the at least one processor to carry out the following actions. An operating system of a terminal device receives a scenario data package from a target application that is currently running, where the scenario data package contains an identifier and key performance parameters of the target application. The operating system determines a performance improvement strategy for the target application according to the identifier and the key performance parameters. The operating system adjusts allocation of system resources for the target application according to the performance improvement strategy.

According to a third aspect of the disclosure, a non-transitory computer readable storage medium is provided. The non-transitory computer readable storage medium stores at least one computer executable instruction thereon, which, when executed by a computer, adapted to carry out the following actions. An operating system of a terminal device receives a scenario data package from a target application that is currently running, where the scenario data package contains an identifier and key performance parameters of the target application. The operating system determines a performance improvement strategy for the target application according to the identifier and the key performance parameters. The operating system adjusts allocation of system resources for the target application according to the performance improvement strategy.

BRIEF DESCRIPTION OF THE DRAWINGS

The following briefly introduces the accompanying drawings required for describing the implementations.

DETAILED DESCRIPTION

Technical solutions of the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first" and "second" used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally further include other steps or units that are not listed; alternatively, other steps or units inherent to the process, method, product, or device can be included either.

The term "embodiment" or "implementation" referred to herein means that a particular feature, structure, or characteristic described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations. The expression of "A and/or B" may refer to A, B, or both A and B.

The terminal device involved in the implementations of the present disclosure may include various handheld devices, on-board devices, wearable devices, computing devices that have wireless communication functions, or other processing devices connected to the wireless modem, as well as various forms of user equipment (UE), mobile stations (MSs), terminal devices, and the like. For the convenience of description, the above-mentioned devices are collectively referred to as a terminal device. An operating system related to the implementations of the disclosure is a software system that manages hardware resources uniformly and provides a user with a service interface.

Figure 1A:
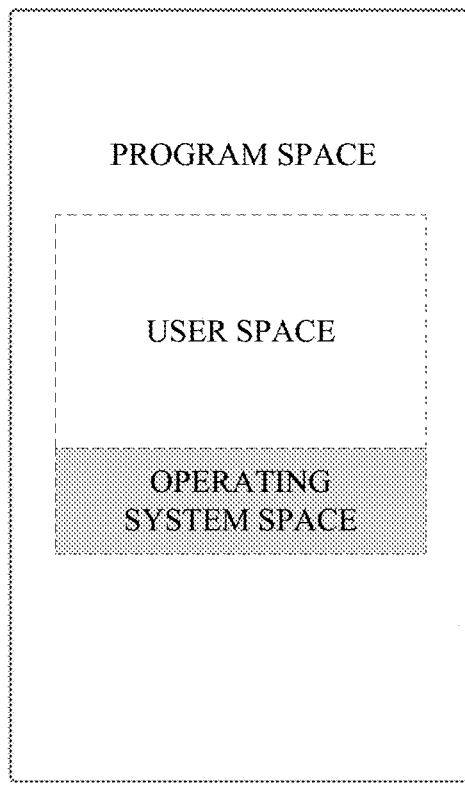
FIG. 1A is a schematic diagram illustrating a program space of a smart phone.
Figure 1B:
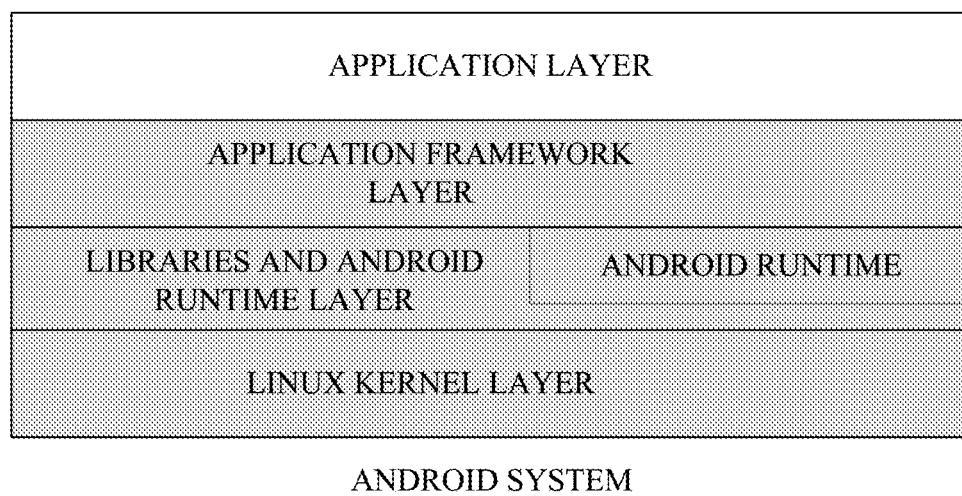
FIG. 1B is a schematic diagram illustrating a system architecture of an Android system.

As illustrated in FIG. 1A, a terminal device such as a smart phone generally has a program space for running programs. The program space includes a user space and an operating system space (that is, a place to install the operating system). At least one application, which is a third-party application installed on the terminal device, can run in the user space. An operating system of the terminal device runs in the operating system space. Examples of the operating system include but are not limited to an Android® system and an iPhone operating system (iOS®) that is a mobile operating system developed by Apple®. The operating system can be installed or stored in a storing space of the terminal device such as a memory and can be accessed by a processor or controller for example. As illustrated in FIG. 1B, the following describes the Android system runs in the terminal device as an example. In the case of Android system, the user space includes an application layer of the Android system. The operating system space includes an application framework layer, Libraries and Android Run-Time layer, and a Linux kernel layer of the Android system. The application layer includes various applications directly interacting with a user or service programs written in the Java language and running in the background, for example, programs for implementing common basic functions on smart phones, such as short messaging service (SMS), telephone dialing, picture viewers, calendars, games, maps, world wide web (Web) browsers and so on, as well as other applications developed by developers. The application framework layer provides a series of libraries necessary for developing Android applications, which can be used to reuse components and achieve personalize extensions through inheritance. The Libraries and Android RunTime layer can support the application framework and provide services for various components in the Android system. The Libraries and Android RunTime layer includes Libraries and Android RunTime. The Android RunTime includes a core library and a Dalvik virtual machine. The Linux kernel layer is configured to implement core functions such as hardware device driving, process and memory management, network protocol stacks, power management, and wireless communications.

A process created by the third-party application runs in the user space at first. When the third-party application needs to execute actions of sending data through the network and reading disk resources, standard interface functions, such as "write" or "send" interface functions, provided by the operating system should be invoked; that is request operations of a user can be achieved by the central processing unit (CPU) invoking codes of the operating system space. Therefore, a third-party application can only invoke the standard interface functions provided by the operating system to achieve functions provided by the operating system. On the other hand, the operating system has no idea about what functions the third-party application is executing, the target application also cannot instruct the operating system to execute special operations, it can be seen that the operating system and the target application are independent from each other. Therefore, the operating system cannot distinguish an internal running scenario of the target application and can only use a set of standard parameters for adapting, so that the targeted performance optimization for the internal running scenario of the target application cannot be achieved.

In view of the above, implementations of the present application provide a method for resource allocation for a target application of a terminal device.

According to the method of the disclosure, an operating system in an operating system space of the terminal device receives a scenario data package from a target application that is currently running, where the scenario data package contains an identifier and key performance parameters of the target application that is currently running. The operating system determines a performance improvement strategy for the target application that is currently running according to the identifier and the key performance parameters. Thereafter the operating system adjusts allocation of system resources for the target application that is currently running according to the performance improvement strategy. In this way, performance optimization of the internal running scenario of the target application under running can be achieved by the operating system, and it is possible to improve the real-time performance and accuracy of the performance optimization of the target application which is conducted under control of the terminal device.

The "identifier" referred to herein may be a scenario identifier or an application type identifier. The scenario identifier can be used to identify running scenarios of applications. For example, for game Apps, the scenario refers to the environment, architecture, machinery, props and so on. Game scenarios are usually understood to restore available elements such as buildings, trees, skies, roads, etc. (including weapon props and NPC, etc.) in the game according to the requirements of a specific project. The application type identifier can be used to identify the type of one or more applications, for example, shopping apps, game apps, group war games, indoor group war games, or outdoor group war games.

The following describes the implementations of the present application with reference to the accompanying drawings.

Figure 2:
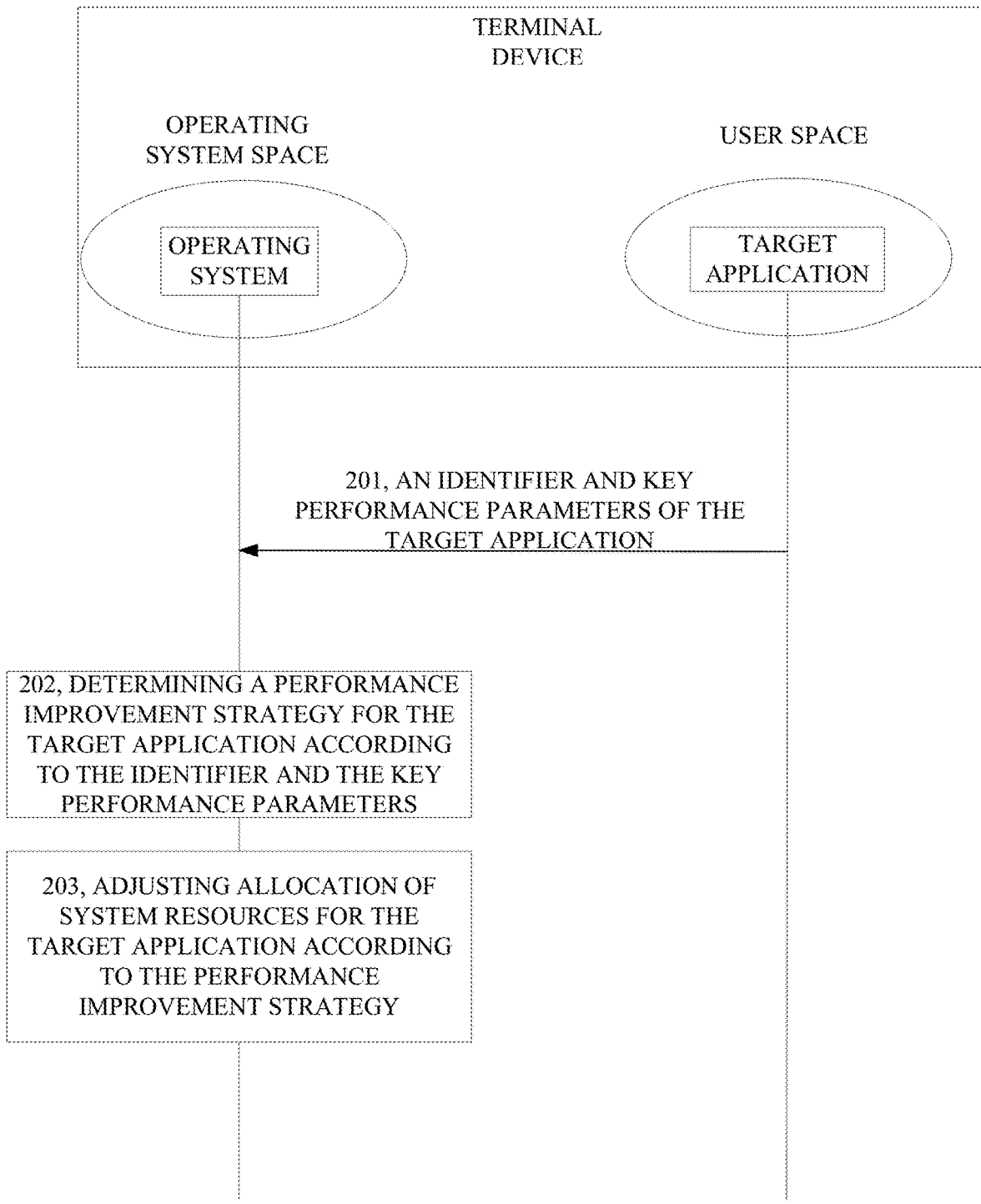
FIG. 2 is a schematic flow chart illustrating a method for resource allocation according to an implementation of the present application.

Referring to FIG. 2, FIG. 2 is a schematic flow chat illustrating a method for resource allocation according to an implementation of the disclosure. The method can be applicable to a terminal device with an operating system and at least one application. The method starts at block 201.

At block 201, the operating system receives a scenario data package from a target application that is currently running, where the scenario data package contains an identifier and key performance parameters of the target application. The scenario data package is a generic term for data related to a specific scenario of an application. As mentioned before, the identifier can be a scenario identifier or an application type identifier.

The target application refers to a third-party application installed in a user space of the terminal device. The third-party application may be an Instant Messenger App or a game App for example. The third-party application may be installed by a user or pre-installed by developers before the terminal device leaves the factory. The disclosure is not limited thereto.

The scenario data package may contain the scenario identifier and/or the application type identifier and the key performance parameters of the target application that is currently running. The scenario data package may further contain at least one of a data format identifier, boot information, resource updating information, account logging information, interface type information, and behavior information of the target application (such as data sending behavior information or data receiving behavior information, or the like). This disclosure is not limited thereto. In addition, a format of the scenario data package may be, for example, a JavaScript object notation (JSON), a protocol buffer (Protobuf), and a custom format, which is not limited herein.

In one implementation, a preset data channel is established between the target application and the operating system. The operating system receives the scenario data package from the target application that is currently running as follows. The operating system receives the scenario data package from the target application that is currently running, through the preset data channel.

The preset data channel may be an effective data transmission link established between the target application and the operating system when the target application is running. When the target application is no longer running, the data transmission link will be cleared.

In one implementation, the target application includes a data connection module. The operating system includes a data connection management module. The management module is configured to communicate with applications installed on the terminal device. The management module has access to the plurality of strategy modules. The strategy module referred to herein can be understood as a database for storing strategy information. Specifically, each strategy module is configured to store at least one performance improvement strategy associated with one class of applications. That is, the strategy modules are adapted for different types of target applications. On the other hand, the strategy module is not merely a database; it also has self-decision and management function. Based on the number of strategy modules included in the operating system, the system resource allocation adjusting method can be implemented in different manners.

Based on such configuration, the above-mentioned method further includes the following. The data connection module and the data connection management module establish the preset data channel.

In one possible implementation, the target application further includes a data collecting module, a data sorting module, a priority management module, and a data receiving module. The data collecting module is configured to collect key information regarding a running target application. The data sorting module is configured to sort the key information collected, such as merging duplicate information and deleting redundant information. The priority management module is configured to classify the key information collected according to the importance of key information. The priority management module is configured to deal with key information with higher priority first and to filter key information with lower priority or make the key information with lower priority less used in a generation process of a data package. The data receiving module is configured to receive and parse data from the operating system in the operating system space, and send the data parsed to an interior of the target application.

At block 202, the operating system determines a performance improvement strategy for the target application according to the scenario identifier and/or the application type identifier and the key performance parameters.

In one implementation, the performance improvement strategy refers to a resource allocation strategy configured to improve running performance of the target application that is currently running. For example, the resource allocation strategy can be a CPU resource adjustment strategy, a graphic processing unit (GPU) resource adjustment strategy, a memory bandwidth resource adjustment strategy, a disk resource adjustment strategy, a network resource adjustment strategy, and so on. The disclosure is not limited herein.

The key performance parameters may be configured to describe key data index of the target application and may include information such as a frame rate, frame loss, and lag of a current internal running scenario.

At block 203, the operating system adjusts allocation of system resources for the target application according to the performance improvement strategy.

In the foregoing method, the operating system can be invoked by a processor or controller to carry out such operations.

In one implementation, the resources include at least one kind of resources of the terminal device: CPU resources, GPU resources, memory bandwidth resources, disk resources, and network resources. The network resources include network resources of a data network of the terminal device, network resources of a wireless fidelity (Wi-Fi) network, and control parameter of a Bluetooth module.

When the system resources are at least one of the CPU resources, the GPU resources, the memory bandwidth resources, and the disk resources, the operating system adjusts the allocation of the system resources via direct communication with the kernel layer of the operating system space. The direct communication refers to communicating directly through an abstract application programming interface (API).

For example, the system resources are network resources. In this situation, the operating system can adjust allocation of the system resources via indirect communication with the kernel layer of the operating system space. The indirect communication is conducted by invoking proxy services. For example, a Wi-Fi subsystem or a data network subsystem in the network resources does not run in the same system as the operating system, in this situation, the system resources can be accessed indirectly through some proxy manners. Further, the operating system provides a proxy service for the Wi-Fi subsystem to indirectly communicate with the Wi-Fi subsystem by invoking an interface of the proxy service.

According to the implementations of the disclosure, the operating system in the operating space of the terminal device receives the scenario data package from the target application that is currently running, where the scenario data package contains the scenario identifier and/or the application type identifier and the key performance parameters of the target application that is currently running. The operating system determines the performance improvement strategy for the target application that is currently running according to the scenario identifier and/or the application type identifier and the key performance parameters. The operating system adjusts the allocation of the system resources for the target application that is currently running according to the performance improvement strategy. Since the scenario data package is sent by the target application that is currently running and contains the identifier and the key performance parameters, the operating system can precisely determine the performance improvement strategy for the target application that is currently running according to the identifier and the key performance parameters, and the operating system can adjust the allocation of the system resources for the target application in real time according to the performance improvement strategy. Therefore, the real-time performance optimization of the running target application can be realized by the operating system, which is beneficial to improving the real-time performance and accuracy of the performance optimization of the target application which is conducted under control of the terminal device.

Multiple strategy modules mode

In one implementation, the operating system includes a management module and a plurality of strategy modules. Each strategy module of the plurality of strategy modules is configured to determine a performance improvement strategy for at least one application of the same application type. The operating system determines the performance improvement strategy for the target application according to the scenario identifier and/or the application type identifier and the key performance parameters as follows. The management module determines the scenario identifier and/or the application type identifier and the key performance parameters in the scenario data package. The management module determines, from among the plurality of strategy modules, a strategy module applicable to the scenario identifier or the application type identifier. The strategy module determines the performance improvement strategy for the target application according to the key performance parameters.

Each of the plurality of strategy modules may be adapted to the same type application. For example, a first strategy module can be adapted to a game App and a second strategy module may be adapted to an instant messenger App.

In one implementation, the management module determines, from among the plurality of strategy modules, the strategy module applicable to the scenario identifier as follows. For each strategy module, the management module queries a scenario identifier set corresponding thereto by using the scenario identifier as a query identifier. The management module determines a strategy module corresponding to a scenario identifier set containing the scenario identifier to be the strategy module applicable to the scenario identifier. The applicable strategy module can be determined quickly and accurately by querying the scenario identifier set.

In the foregoing implementations, fine control for different types of applications can be achieved by the plurality of strategy modules. With aid of the technical solutions of the present disclosure, there is no need for the terminal device to load all strategy modules at the same time, instead, the terminal device only needs to load the strategy module corresponding to the target application running in the foreground of the terminal device, which helps to reduce resource consumption and to improve resource utilization rate and control efficiency.

In one implementation, the scenario data package contains a data format identifier. Based on this, the management module determines the scenario identifier and the key performance parameters in the scenario data package as follows. The management module determines the scenario identifier and the key performance parameters by parsing the scenario data package according to a data format indicated by the data format identifier.

The data format identifier may be JSON or Protobuf for example, the disclosure however is not limited thereto.

As can be seen, since the operating system can quickly identify a data transmission format that the scenario data package used according to the data format identifier after the scenario data package is received, the scenario identifier and the key performance parameters in the scenario data package can be parsed in real time and therefore, a processing delay can be reduced; furthermore, it is possible to improve data processing efficiency and improve real-time performance of resource adjustment for the target application under running.

In one implementation, the strategy module determines the performance improvement strategy for the target application according to the key performance parameters as follows. The strategy module determines resources associated with the key performance parameters to be system resources to-be-adjusted, determines an adjustment amount of the system resources to-be-adjusted according to the key performance parameters, and determines the performance improvement strategy for the target application according to the adjustment amount. Determining the performance improvement strategy may be comprehended as determining one performance improvement strategy from existing multiple performance improvement strategies, or generating a new performance improvement strategy, the present disclosure is not particularly limited.

The key performance parameters may include parameter types and parameter numerical values. Resources associated with the key performance parameters can be determined by querying a correspondence relationship between parameter types of the key performance parameters and resources. The correspondence relationship may include a correspondence relationship between frame rates and GPU resources, a correspondence relationship between interface rendering speeds and resource combinations (such as a combination of the CPU resources and GPU resources), or the like. The disclosure is not limited thereto. The parameter numerical values are configured to determine the adjustment amount of the system resources to-be-adjusted. In particular, the parameter numerical values can be compared with reference numerical values to accurately determine the adjustment amount.

As can be seen, in the foregoing implementations, the resources associated with the key performance parameters are the system resources to-be-adjusted and the parameter numerical values of the key performance parameters are further configured to accurately determine the adjustment amount of the system resources to-be-adjusted, which is beneficial to improving the accuracy of operation optimization of the target application which is conducted under control of the terminal device.

In another implementation, the strategy module determines the performance improvement strategy for the target application according to the key performance parameters as follows. The strategy module determines a parameter type(s) and a parameter numerical range of the key performance parameters, determines a performance improvement strategy package(s) corresponding to the parameter type(s), and determines, from among the performance improvement strategy package(s), a performance improvement strategy suitable for the parameter numerical range by using the parameter numerical range as a query identifier.

In particular, one parameter type corresponds to one performance improvement strategy package. The performance improvement strategy package includes a plurality of performance improvement strategies, where each performance improvement strategy corresponds to one parameter numerical range.

In one implementation, since the parameter type of the key performance parameters can be used to determine the performance improvement strategy package and the parameter numerical values of the key performance parameters can be used to quickly determine a performance improvement strategy in the performance improvement strategy package, that is, a performance improvement strategy suitable for the current running scenario can be quickly determined by querying and therefore, it is possible to improve the speed and efficiency of operation optimization of the target application which is conducted under control of the terminal device.

Single strategy module mode

In one implementation, the operating system includes a management module and a strategy module. The operating system determines the performance improvement strategy for the target application according to the scenario identifier and/or the application type identifier and the key performance parameters as follows. The strategy module acquires the scenario identifier and/or the application type identifier and the key performance parameters from the scenario data package, determines system resources to-be-adjusted corresponding to the scenario identifier or the application type identifier, and determines the performance improvement strategy for the target application according to the system resources to-be-adjusted and the key performance parameters.

In one implementation, the system resources to-be-adjusted corresponding to the scenario identifier or the application type identifier can be obtained by querying a corresponding relationship between scenario identifiers and system resources to-be-adjusted or a corresponding relationship between application type identifiers and system resources to-be-adjusted.

As can be seen, the identifier is configured to be used to quickly determine the system resources to-be adjusted of the target application and the key performance parameters are configured to be used to precisely determine an adjustment amount of the system resources to-be-adjusted, which is beneficial to improving the accuracy and the speed of operation optimization of the target application which is conducted under control of the terminal device. In addition, the operating system includes the management module and the strategy module; these two modules can be cooperated with each other to determine the performance improvement strategy for the target application. That is, the process of determining the performance improvement strategy can be achieved follow a modular approach, with each module achieves a corresponding function and when an error occurs in the execution process of one module, it will not affect a state of another module. Thus, the stability of operation optimization of the target application, which is conducted under control of the terminal device, can be improved.

In one implementation, the strategy module determines the performance improvement strategy for the target application according to the system resources to-be-adjusted and the key performance parameters as follows. The strategy module determines the adjustment amount of the system resources to-be-adjusted according to parameters associated with the system resources to-be-adjusted in the key performance parameters, and generates or determines the performance improvement strategy for the target application according to the adjustment amount.

The key performance parameters may include parameter types and parameter numerical values. The parameter numerical values are configured to further determine the adjustment amount of the system resources to-be-adjusted. The adjustment amount can be obtained by calculating according to a preset formula. Weights of different types of parameters in the formula can be set according to influence factors of the resources associated with the parameters on the operation performance of the target application. In particular, the greater the influence factors, the greater the weight of a parameter, which is beneficial to improving the accuracy of adjustment amount calculation.

As can be seen, in the foregoing implementations, from among the key performance parameters, parameters associated with the system resources to-be-adjusted are configured to be used to determine the adjustment amount of the system resources to-be-adjusted, which allows to prevent unrelated parameters from affecting the adjustment amount calculation and helps to improve the accuracy of operation optimization of the target application which is conducted under control of the terminal device.

In one implementation, the scenario data package contains a data format identifier. In this case, the strategy module determines the scenario identifier and/or the application type identifier and the key performance parameters in the scenario data package as follows.

The management module determines a data format of the scenario data package according to the data format identifier in the scenario data package, determines the scenario identifier and/or the application type identifier and the key performance parameters of the target application by parsing the scenario data package according to a data format indicated by the data format identifier, and sends the scenario identifier and/or the application type identifier, the key performance parameters to the strategy module. It can be seen that, the management module processes the scenario data package in a unified manner and what the strategy module needs to do is receiving from management module the processing result. With aid of such setting, functions of the strategy module can be optimized and refined, which facilitates maintenance, addition, and other operations performed on the strategy module, therefore improving system stability.

Alternatively, the management module sends the scenario data package to the strategy module. The strategy module determines a data format of the scenario data package according to the data format identifier in the scenario data package and determines the scenario identifier and/or the application type identifier and the key performance parameters of the target application by parsing the scenario data package according to the data format indicated by the data format identifier. After sending the scenario data package to the strategy module, the management module can enter a dormant state to reduce power consumption. It can be seen that the management module just sends the scenario data package to the strategy module directly for processing. Therefore, the management module can quickly enter a dormant state after sending the scenario data package to the strategy module, and there is no need for the management module to be continuously enabled, which is beneficial to reducing the overall power consumption of the operating system and improving the efficiency.

Alternatively, the management module determines a first data format associated with the strategy module, converts a second data format of the scenario data package into the first data format when the second data format is different from the first data format, and sends to the strategy module the scenario data package converted. Then the strategy module determines the scenario identifier and/or the application type identifier, the key performance parameters of the target application, by parsing the scenario data package converted according to the first data format. Thus, the management module can convert the scenario data package that the strategy module cannot recognize into a scenario data package that the strategy module is able to recognize, and send the scenario data package converted to the strategy module for processing. As a result, the situation that the scenario identifier and/or the application type identifier, the key performance parameters cannot be accurately determined due to a difference in formats can be avoided, which is beneficial to improving the success rate of resource allocation for the target application that is currently running.

In one implementation, the strategy module determines the system resources to-be-adjusted corresponding to the scenario identifier as follows. The strategy module determines the system resources to-be-adjusted corresponding to the scenario identifier by querying a preset mapping relationship between system resources to-be-adjusted and scenario identifiers via using the scenario identifier as a query identifier. Similarly, the strategy module determines the system resources to-be-adjusted corresponding to the application type identifier as follows. The strategy module determines the system resources to-be-adjusted corresponding to the application type identifier by querying a preset mapping relationship between system resources to-be-adjusted and application type identifiers via using the application type identifier as a query identifier. As can be seen, the system resources to-be-adjusted can be quickly determined by querying a mapping relationship, which helps to improve the speed of operation optimization of the target application which is conducted under control of the terminal device.

Figure 3:
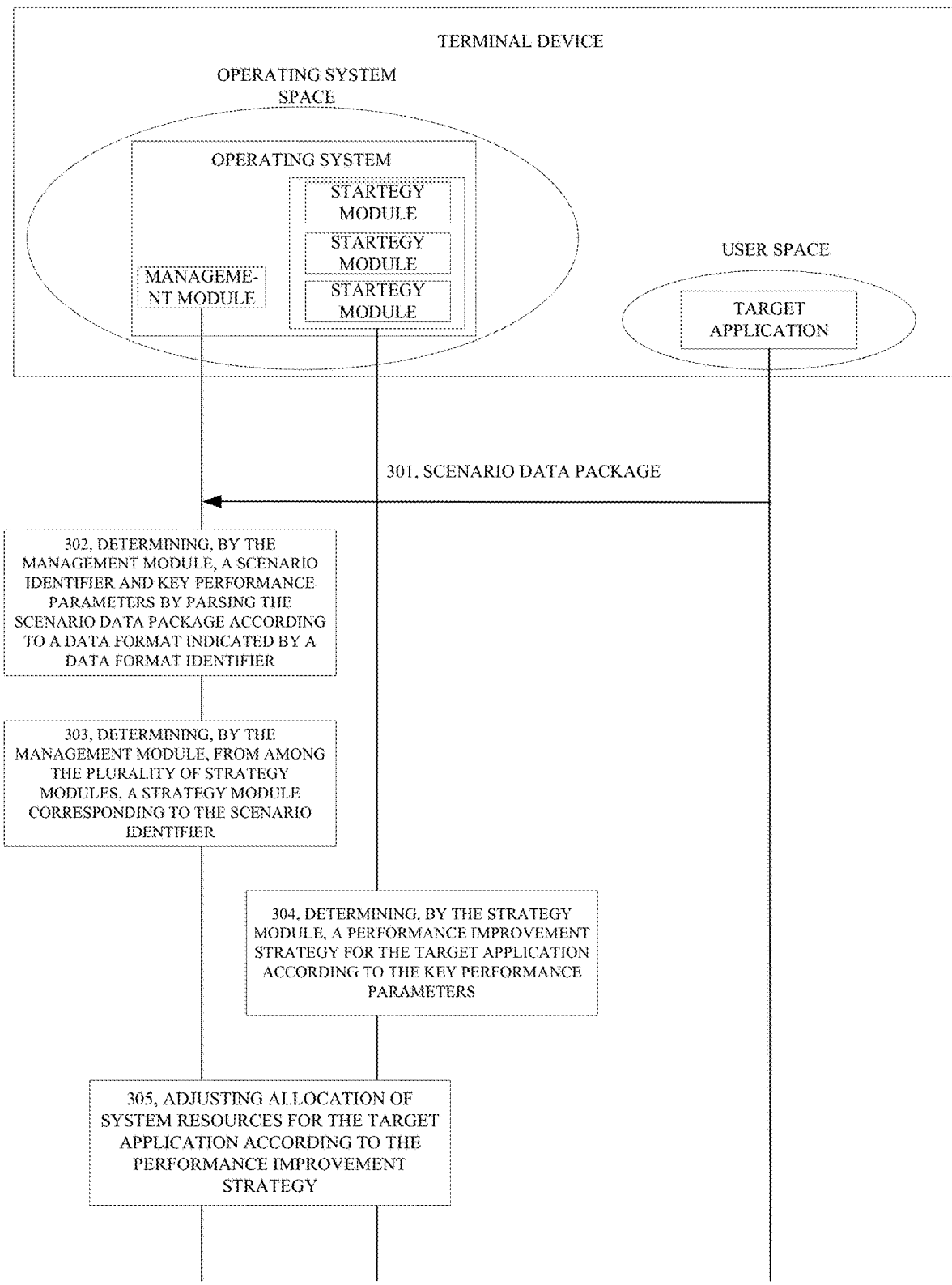
FIG. 3 is a schematic flow chart illustrating a method for resource allocation according to an implementation of the present application.

Consistent with the implementations illustrated in FIG. 2, FIG. 3 is a schematic flow chart illustrating a method for resource allocation according to an implementation of the present application. The method is applicable to a terminal device with an operating system and at least one application. The operating system includes a management module and a plurality of strategy modules. Each strategy module is configured to determine a performance improvement strategy for at least one application of the same application type. In this method, take the scenario identifier as an example of the identifier referred to block 201. As illustrated in FIG. 3, the method starts at block 301.

At block 301, the operating system receives a scenario data package from the target application that is currently running, where the scenario data package contains a scenario identifier and key performance parameters of the target application.

At block 302, the management module determines the scenario identifier and the key performance parameters by parsing the scenario data package according to a data format indicated by a data format identifier.

At block 303, the management module determines, from among the plurality of strategy modules, a strategy module corresponding to the scenario identifier. In case of the single strategy module mode, skip the operation at block 303.

At block 304, the strategy module determines a performance improvement strategy for the target application according to the key performance parameters.

At block 305, the operating system adjusts allocation of system resources for the target application according to the performance improvement strategy.

In the foregoing method, the operating system, the management module, and the strategy module can be invoked by a controller or a processor to carry out such operations at block 301-block 305.

According to the implementation of the disclosure, the operating system in an operating system space of the terminal device receives the scenario data package from the target application that is currently running, where the scenario data package contains the scenario identifier and the key performance parameters of the target application that is currently running. Then the operating system determines the performance improvement strategy for the target application that is currently running according to the scenario identifier and the key performance parameters. The operating system adjusts the allocation of the system resources for the target application that is currently running according to the performance improvement strategy. Since the scenario data package is sent by the target application that is currently running and contains the scenario identifier and the key performance parameters, the operating system can accurately determine the performance improvement strategy for the target application that is currently running according to the scenario identifier and the key performance parameters, and the operating system can adjust the allocation of the system resources for the target application in real time according to the performance improvement strategy. Therefore, the performance optimization of the running target application can be achieved by the operating system in real time, which is helpful for improving the real-time performance and accuracy of the performance optimization of the target application which is conducted under control of the terminal device.

In addition, with aid of the technical solutions of the present disclosure, fine control for different types of applications can be achieved with the plurality of strategy modules; there is no need for the terminal device to load all strategy modules at the same time, instead, the terminal device only needs to load the strategy module corresponding to the target application running in the foreground of the terminal device, which helps to reduce resource consumption of the terminal device and to improve resource utilization rate and control efficiency.

Moreover, since the operating system can quickly identify a data transmission format used in the scenario data package according to the data format identifier after receiving the scenario data package, the scenario identifier and the key performance parameters in the scenario data package can be parsed in real time, and a processing delay can be reduced. Furthermore, in this way, it is possible to improve data processing efficiency and improve real-time performance of resource adjustment for the target application under running.

Figure 4:
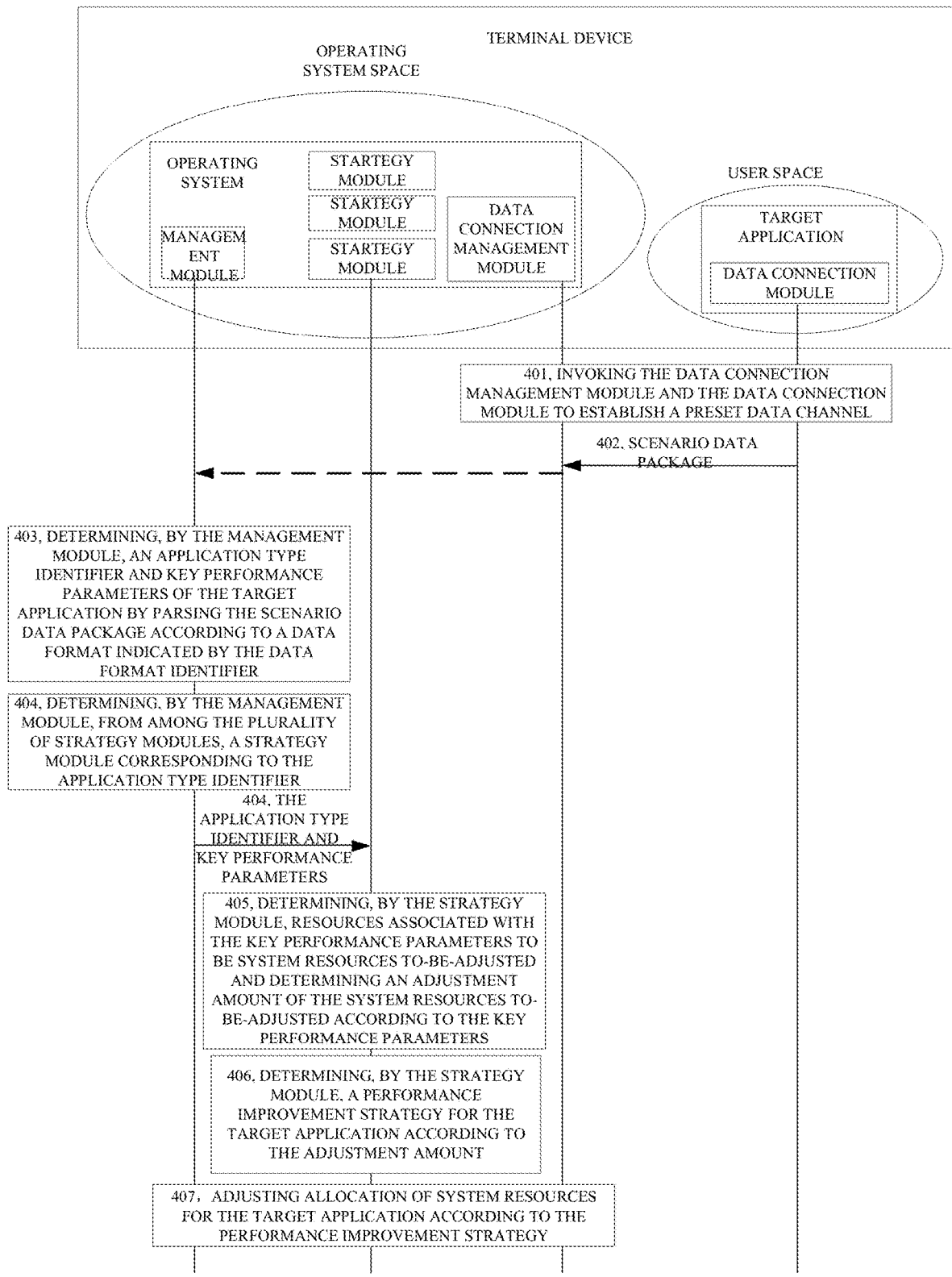
FIG. 4 is a schematic flow chart illustrating a method for resource allocation according to an implementation of the present application.

Consistent with the implementations illustrated in FIG. 2, FIG. 4 is a schematic flow chart illustrating a method for resource allocation. The method is applicable to a terminal device with an operating system and one or more application. The operating system includes a management module, a plurality of strategy modules, and a data connection management module. Each strategy module is configured to determine a performance improvement strategy for at least one application of the same application type. A target application includes a data connection module. A scenario data package contains an application type identifier and key performance parameters of the target application and a data format identifier. The target application includes a data connection module and the operating system includes a data connection management module. As can be seen, different from the method of FIG. 3, in this method, we use the application type identifier as an example of the identifier referred to block 201. As illustrated in FIG. 4, the method begins at block 401.

At block 401, a preset data channel is established by a data connection management module and a data connection module.

At block 402, the data connection management module receives a scenario data package from the target application through the preset data channel.

At block 403, the management module determines the application type identifier and the key performance parameters of the target application by parsing the scenario data package according to a data format indicated by the data format identifier.

At block 404, the management module determines, from among the plurality of strategy modules, a strategy module corresponding to the application type identifier, and sends the application type identifier and the key performance parameters to the strategy module. In case of the single strategy module mode, skip the operation at block 404.

At block 405, the strategy module determines resources associated with the key performance parameters to be system resources to-be-adjusted and determines an adjustment amount of the system resources to-be-adjusted according to the key performance parameters.

At block 406, the strategy module determines a performance improvement strategy for the target application according to the adjustment amount.

At block 407, the operating system adjusts allocation of system resources for the target application according to the performance improvement strategy.

In the foregoing method, the operating system, the management module, and the strategy module can be invoked by a controller or a processor to carry out such operations at block 401-block 407.

According to the implementations of the disclosure, the operating system in an operating system space of the terminal device receives the scenario data package from the target application that is currently running, where the scenario data package contains the application type identifier and the key performance parameters of the target application that is currently running. The operating system determines the performance improvement strategy for the target application that is currently running according to the application type identifier and the key performance parameters. Thereafter, the operating system adjusts the allocation of the system resources for the target application that is currently running according to the performance improvement strategy. Since the scenario data package is sent by the target application that is currently running and contains the application type identifier and the key performance parameters, the operating system can accurately determine the performance improvement strategy for the target application that is currently running according to the application type identifier and the key performance parameters, and the operating system can adjust the allocation of the system resources for the target application in real time according to the performance improvement strategy. As such, the operating system can optimize performance of the target application under running in real time, which is helpful for improving the real-time performance and accuracy of the performance optimization of the target application which is conducted under control of the terminal device.

The application type identifier is configured to quickly determine the system resource to-be-adjusted of the target application, and the key performance parameters are configured to accurately determine the adjustment amount of the system resource to-be-adjusted, which helps to improving the accuracy and the speed of operation optimization of the target application which is conducted under control of the terminal device.

In addition, the operating system includes a management module and a strategy module. The management module and the strategy module can be cooperated with each other to determine the performance improvement strategy for the target application, that is, the process of determining the performance improvement strategy can be achieved follow a modular approach, with each module performs an independent function. When an error occurs in one module, it will not affect a state of another module, and the stability of operation optimization of the target application, which is conducted under control of the terminal device, can be improved.

As can be seen, in the foregoing implementations, from among the key performance parameters, parameters associated with the system resource to-be-adjusted are configured to be used to determine the adjustment amount of the system resource to-be-adjusted, which can prevent unrelated parameters from affecting the adjustment amount calculation and help to improve the accuracy of operation optimization of the target application which is conducted under control of the terminal device.

In addition, the management module processes the scenario data package in a unified manner, and what the strategy module needs to do is receiving from the management module the processing result. With aid of such setting, functions of the strategy module can be optimized and refined, which facilitates maintenance, addition, and other operations performed on the strategy module, therefore improving system stability.

Figure 5:
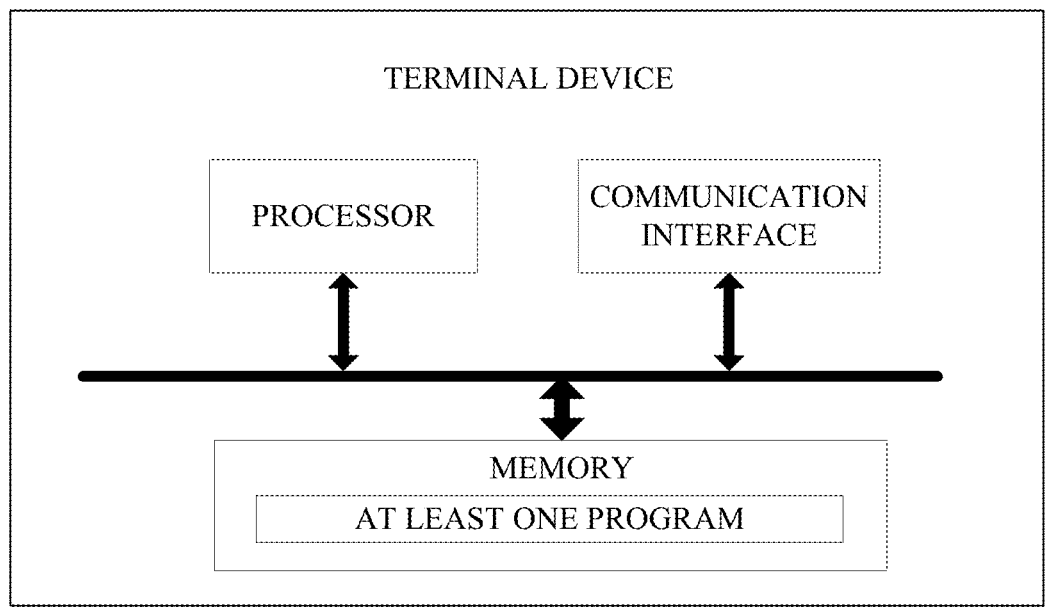
FIG. 5 is a schematic structural diagram illustrating a terminal device according to an implementation of the present application.

Consistent with the foregoing implementations illustrated in FIG. 2, FIG. 3, or FIG. 4, FIG. 5 is a schematic structural diagram illustrating a terminal device according to an implementation of the disclosure. The terminal device has at least one application running thereon and an operating system. As illustrated in FIG. 5, the terminal device includes a processor, a memory, a communication interface, and at least one program. The at least one program is different from the foregoing at least one application. The at least one program is stored in the memory and configured to be performed by the processor. The at least one program includes instructions being operable to perform the following operations.

A scenario data package from a target application that is currently running is received, where the scenario data package contains a scenario identifier and/or an application type identifier and key performance parameters of the target application.

A performance improvement strategy for the target application is determined according to the scenario identifier and/or an application type identifier and the key performance parameters.

Allocation of system resources for the target application is determined according to the scenario identifier and/or an application type identifier and the key performance parameters.

According to the implementation of the disclosure, the operating system in an operating system space of the terminal device receives the scenario data package from the target application that is currently running, where the scenario data package contains at least one of the scenario identifier and the application type identifier and the key performance parameters of the target application that is currently running. The operating system determines the performance improvement strategy for the target application that is currently running according to the scenario identifier and/or the application type identifier and the key performance parameter. Thereafter, the operating system adjusts the allocation of system resources for the target application that is currently running according to the performance improvement strategy. Since the scenario data package is sent by the target application that is currently running and contains the scenario identifier and/or the application type identifier and the key performance parameters, the operating system can precisely determine the performance improvement strategy for the target application that is currently running according to the scenario identifier and/or the application type identifier and the key performance parameters, and the operating system can adjust the allocation of the system resources for the target application in real time according to the performance improvement strategy. Therefore, the real-time performance optimization of the target application under running can be realized by the operating system, which is beneficial to improving the real-time performance and accuracy of the performance optimization of the target application which is conducted under control of the terminal device.

In one implementation, the operating system includes a management module and a plurality of strategy modules. In terms of determining the performance improvement strategy for the target application according to the scenario identifier and/or the application type identifier and the key performance parameters, the instructions are operable to carry out the following: controlling the management module to determine the scenario identifier and/or the application type identifier and the key performance parameters in the scenario data package; controlling the management module to determine, from among the plurality of strategy modules, a strategy module corresponding to the scenario identifier and/or the application type identifier; controlling the strategy module to determine the performance improvement strategy for the target application according to the key performance parameters.

In one implementation, the scenario data package contains a data format identifier. In terms of controlling the management module to determine the scenario identifier and the key performance parameters in the scenario data package, the instructions are operable to carry out the following: controlling the management module to determine the scenario identifier and/or the application type identifier and the key performance parameters by parsing the scenario data package according to a data format indicated by the data format identifier.

In one implementation, in terms of controlling the strategy module to determine the performance improvement strategy for the target application according to the key performance parameters, the instructions are operable to carry out the following: controlling the strategy module to determine resources associated with the key performance parameters as the system resources to-be-adjusted; controlling the strategy module to determine the adjustment amount of the system resources to-be-adjusted according to the key performance parameters; controlling the strategy module to generate the performance improvement strategy for the target application according to the adjustment amount; controlling the strategy module to determine the performance improvement strategy generated as the performance improvement strategy for the target application.

Alternatively, in terms of controlling the strategy module to determine the performance improvement strategy for the target application according to the key performance parameters, the instructions are operable to carry out the following: controlling the strategy module to determine a parameter type(s) and a parameter numerical range of the key performance parameters; controlling the strategy module to determine a performance improvement strategy package corresponding to the parameter type(s); controlling the strategy module to determine, from among the performance improvement strategy package, a performance improvement strategy applicable to the parameter numerical range by using the parameter numerical range as a query identifier.

In one implementation, the operating system includes a management module and a strategy module. In terms of determining the performance improvement strategy for the target application according to the scenario identifier and the key performance parameters, the instructions are operable to carry out the following: controlling the strategy module to acquire the scenario identifier and/or the application type identifier and the key performance parameters from the scenario data package; controlling the strategy module to determine system resources to-be-adjusted corresponding to the scenario identifier; controlling the strategy module to determine the performance improvement strategy for the target application according to the system resources to-be-adjusted and the key performance parameters.

In one implementation, in terms of controlling the strategy module to determine the performance improvement strategy for the target application according to the system resources to-be-adjusted and the key performance parameters, the instructions are operable to carry out the following: controlling the strategy module to determine the adjustment amount of the system resources to-be-adjusted according to parameters associated with the system resources to-be-adjusted from among the key performance parameters; controlling the strategy module to generate the performance improvement strategy for the target application according to the adjustment amount.

In one implementation, a preset data channel is established between the target application and the operating system. In terms of receiving the scenario data package from the target application that is currently running through a communicating unit, the instructions are operable to carry out the following: receiving via the preset data channel the scenario data package from the target application that is currently running, through the communicating unit.

In one implementation, the target application includes a data connection module. The operating system includes a data connection management module. The programs further include instructions operable to perform the following: prior to controlling the data connection management module to receive the scenario data package form the target application through the preset data channel, controlling the data connection management module and the data connection module to establish the preset data channel In one possible implementation, the resources include at least one of CPU resources, GPU resources, memory bandwidth resources, disk resources, and network resources.

The foregoing mainly describes the solutions of the implementations of the present application from the perspective of the implementation process of the method. It can be understood that, in order to achieve the above functions, the terminal device may include hardware structures and/or software modules corresponding to the respective functions. Those skilled in the art should readily recognize that, in combination with the exemplary units and scheme steps or operations described in the implementations provided herein, the present disclosure can be implemented in hardware or a combination of hardware and computer software. Whether a function is implemented by way of hardware or computer software driving hardware depends on the particular application and design constraints of the technical solution. Those skilled in the art may use different methods to implement the described functions for each particular application, but such implementation should not be considered as beyond the scope of the present disclosure.

According to the implementations of the present disclosure, functional units may be divided for the terminal device according to the foregoing method examples. For example, functional units may be divided according to corresponding functions and two or more functions may be integrated into one processing unit. The above-mentioned integrated unit can be implemented in the form of hardware or software functional units. It should be noted that the division of units in the implementations of the present disclosure is schematic and is merely a logical function division; there may be other division modes in actual implementations.

Figure 6:
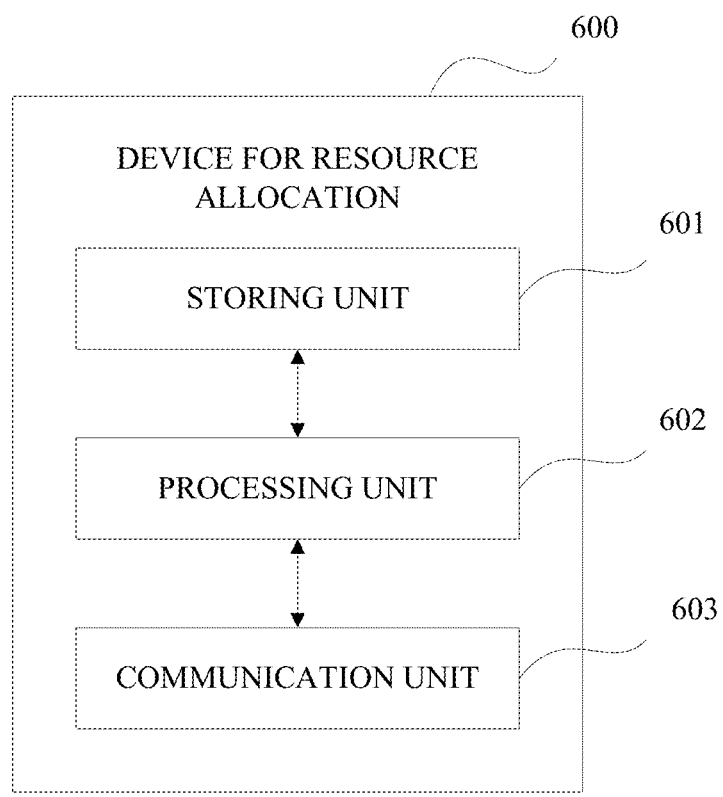
FIG. 6 is a block diagram illustrating functional units of a terminal device according to an implementation of the disclosure.

FIG. 6 is a block diagram illustrating functional units of a device for resource allocation according to an implementation of the disclosure, when integrated units are adopted. The device 600 includes a processing unit 602 and a communicating unit 603. The processing unit 602 is configured to control and manage operations of the device for resource allocation. For example, the processing unit 602 is configured to support the device for resource allocation to perform operations at block 201-block 203 illustrated in FIG. 2, operations at block 301-block 305 illustrated in FIG. 3, operations at block 401-block 407 illustrated in FIG. 4, and/or other processes for the techniques described herein. The device 600 may further include a storing unit 601 for storing program codes and data. The processing unit 602 and the communicating unit 603 can be integrated into a processor; the storing unit 601 can be implemented by a non-transitory storage medium such as a memory.

The processing unit 602 is configured to: receive a scenario data package from a target application that is currently running, through the communicating unit 603, where the scenario data package contains a scenario identifier and/or an application type identifier as well as key performance parameters of the target application, and to determine a performance improvement strategy for the target application according to the scenario identifier and/or the application type identifier and the key performance parameters; adjust allocation of system resources for the target application according to the performance improvement strategy.

In one implementation, the operating system includes a management module and a plurality of strategy modules. The processing unit 602 configured to determine the performance improvement strategy for the target application according to the scenario identifier and/or the application type identifier and the key performance parameters is configured to: control the management module to determine the scenario identifier and/or the application type identifier and the key performance parameters from the scenario data package; control the management module to determine, from among the plurality of strategy modules, a strategy module applicable to the scenario identifier and/or the application type identifier; control the strategy module to determine the performance improvement strategy for the target application according to the key performance parameters.

In one implementation, the scenario data package includes a data format identifier. The processing unit 602 configured to control the management module to determine the scenario identifier and the key performance parameters in the scenario data package is configured to: control the management module to determine the scenario identifier and/or the application type identifier and the key performance parameters by parsing the scenario data package according to a data format indicated by the data format identifier.

In one implementation, the processing unit 602 configured to control the strategy module to determine the performance improvement strategy for the target application according to the key performance parameters is configured to: control the strategy module to determine resources associated with the key performance parameters as system resources to-be-adjusted; determine an adjustment amount of the system resources to-be-adjusted according to the key performance parameters; generate the performance improvement strategy for the target application according to the adjustment amount; determine the performance improvement strategy generated as the performance improvement strategy for the target application.

Alternatively, the processing unit 602 configured to control the strategy module to determine the performance improvement strategy for the target application according to the key performance parameters is configured to: control the strategy module to determine a parameter type and a parameter numerical range of the key performance parameters; determine a performance improvement strategy package corresponding to the parameter type; determine, from among the performance improvement strategy package, a performance improvement strategy applicable to the parameter numerical range by using the parameter numerical range as a query identifier.

The operating system includes a management module and a strategy module. The processing unit 602 configured to determine the performance improvement strategy for the target application according to the scenario identifier and/or the application type identifier and the key performance parameters is configured to: control the strategy module to acquire the scenario identifier and/or the application type identifier and the key performance parameters in the scenario data package; control the strategy module to determine system resources to-be-adjusted corresponding to the scenario identifier and/or the application type identifier; control the strategy module to determine the performance improvement strategy for the target application according to the system resources to-be-adjusted and the key performance parameters.

In one implementation, the processing unit 602 configured to control the strategy module to determine the performance improvement strategy for the target application according to the system resources to-be-adjusted and the key performance parameters is configured to control the strategy module to: determine an adjustment amount of the system resources to-be-adjusted according to parameters associated with the system resources to-be-adjusted from among the key performance parameters; determine the performance improvement strategy for the target application according to the adjustment amount.

In one implementation, a preset data channel is established between the target application and the operating system. The processing unit 602 configured to receive the scenario data package from the target application that is currently running through the communicating unit 603 is configured to: receive via the preset data channel the scenario data package from the target application that is currently running, through the communicating unit 603.

In one implementation, the target application includes a data connection module. The operating system includes a data connection management module. The device further includes a channel establishment unit. The channel establishment unit is configured to control the data connection management module and the data connection module to establish the preset data channel.

In one implementation, the resources include at least one kind of resources of the terminal device: CPU resources, GPU resources, memory bandwidth resources, disk resources, and network resources.

The processing unit 602 may be a processor or a controller. The communicating unit 603 may be an internal communication interface between the processor and the program space, such as a communication interface between the processor and the operating system or a communication interface between the processor and the user space. The storing unit 601 may be a memory.

Figure 7:
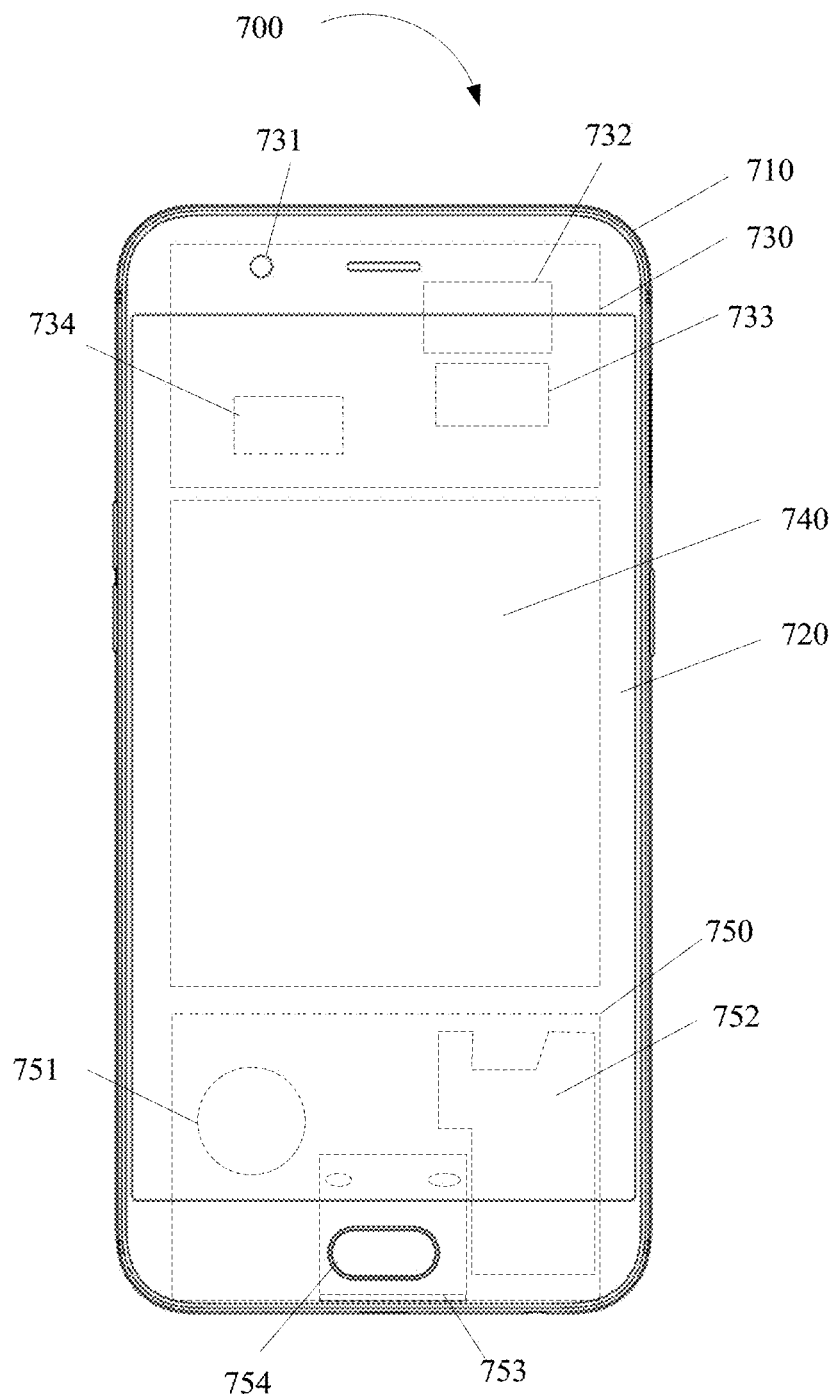
FIG. 7 is a schematic structural diagram illustrating a smart phone according to an implementation of the disclosure.

Referring to FIG. 7, FIG. 7 is a schematic structural diagram illustrating a smart phone 700 according to an implementation of the disclosure. The smart phone 700 includes a housing 710, a touch display screen 720, a main board 730, a battery 740, and a sub-board 750. The main board 730 is provided with a front camera 731, a processor 732, a memory 733, and a power management chip 734. The sub-board 750 is provided with a vibrator 751, an integrated audio cavity 752, a VOOC flash charging interface 753, and a fingerprint recognition module 754.

The smart phone has a target application running thereon and an operating system. The target application runs in a user space and the operating system runs in an operating system space. The operating system is configured to receive a scenario data package from the target application that is currently running. The scenario data package contains a scenario identifier and/or an application identifier and key performance parameters of the target application. The operating system is configured to determine a performance improvement strategy for the target application according to the scenario identifier and/or an application identifier and the key performance parameters of the target application. The operating system is further configured to adjust allocation of system resources for the target application that is currently running according to the performance improvement strategy.

The processor 732 is a control center of the mobile phone. The processor 732 is configured to connect various parts of the entire smart phone through various interfaces and lines, run or execute software programs and/or modules stored in the memory 733, and invoke data stored in the memory 733, to execute various functions of the smart phone and process data, thereby monitoring the smart phone as a whole. In at least one implementation, the processor 732 may include at least one processing unit. For example, the processor 732 can be integrated with an application processor and a modem processor, where the application processor is mainly configured to handle and maintain an operating system, a user interface, applications, and so on. The modem processor is mainly configured to process wireless communication. It will be appreciated that the above-mentioned modem processor mentioned above may not be integrated into the processor 732. The processor 732 may be, for example, a central processing unit (CPU), a general-purpose processor, a digital signal processor (DSP), an application-specific integrated circuit (ASIC), a field programmable gate array (FPGA), or other programmable logic devices, transistor logic devices, hardware components, or any combination thereof. Various exemplary logical blocks, modules, and circuits described in conjunction with the disclosure may be achieved or implemented. The processor may also be a combination of computing functions, for example, a combination of one or more microprocessors, a combination of the DSP and a microprocessor, and the like.

The memory 733 is configured to store software programs and modules. The processor 732 is configured to execute various function applications and data processing of the smart phone by running the software programs and the modules stored in the memory 733. The memory 733 may mainly include a program storage area and a data storage area. The program storage area may store an operating system, applications required for at least one function, and the like. The data storage area may store data created according to the use of the smart phone, and the like. In addition, the memory 733 may include a high-speed random access memory (RAM), and may further include a non-transitory memory such as at least one disk storage device, a flash device, or other non-transitory solid storage devices. The memory 733 may be, for example, a RAM, a flash memory, a read only memory (ROM), an erasable programmable ROM (EPROM), or an electrically EPROM (EEPROM), a register, a hard disk, a mobile hard disk, a compact disc-read only memory (CD-ROMs), or any other form of storage medium known in the art.

Implementations of the present disclosure also provide a computer storage medium. The computer storage medium stores computer programs for electronic data interchange which, when executed, are operable with a computer to perform all or part of the operations of any of the methods described in the above-described method implementations. The computer may include a terminal device.

Implementations of the present disclosure also provide a computer program product. The computer program product includes a non-transitory computer-readable storage medium storing computer programs. The computer programs are operable with a computer to perform all or part of the operations of any of the methods described in the above method implementations. The computer program product may be a software installation package. The computer may include a terminal device.

It is to be noted that, for the sake of simplicity, the foregoing method implementations are described as a series of action combinations. However, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the device disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random access memory (RAM), a mobile hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, a disk or a compact disc (CD), and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for resource allocation, comprising:
    receiving, by an operating system of a terminal device, a scenario data package from a target application that is currently running, wherein the scenario data package comprises an identifier and key performance parameters of the target application, wherein the identifier comprises a scenario identifier, wherein the scenario identifier is used for identifying, from a plurality of scenarios of the target application, a scenario that is currently running, wherein the key performance parameters are in association with the scenario that is currently running and wherein the operating system comprises a management module and a plurality of strategy modules;
    determining, by the operating system, a performance improvement strategy for the target application according to the identifier and the key performance parameters, comprising:
        determining, by the management module, the identifier and the key Performance parameters in the scenario data package;
        determining by the management module and from the plurality of strategy modules, a strategy module corresponding to the identifier; and
        determining by the strategy module, the performance improvement strategy for the target application according to the key performance parameters, comprising:
            determining, by the strategy module, a parameter type and a parameter numerical range of the key performance parameters:
            determining, by the strategy module, a performance improvement strategy package corresponding to the parameter type; and
            determining, by the strategy module and from the performance improvement strategy package, the performance improvement strategy corresponding to the parameter numerical range by using the parameter numerical range as a query identifier; and
    adjusting, by the operating system, allocation of system resources for the target application according to the performance improvement strategy.

2. The method of claim 1, wherein each strategy module of the plurality of strategy modules is configured to determine a performance improvement strategy for at least one application of the same application type.

3. The method of claim 1, the scenario data package comprising a data format identifier, wherein determining, by the management module, the identifier and the key performance parameters in the scenario data package comprises:
    determining, by the management module, the identifier and the key performance parameters by parsing the scenario data package according to a data format indicated by the data format identifier.

4. The method of claim 1, wherein a preset data channel is established between the target application and the operating system, and receiving, by the operating system, the scenario data package from the target application that is currently running comprises:
    receiving, by the operating system, the scenario data package from the target application that is currently running, through the preset data channel.

5. A terminal device, comprising:
    at least one processor; and
    a computer readable storage medium, coupled to the at least one processor and storing at least one computer executable instruction thereon which, when executed by the at least one processor, causes the at least one processor to:
        receive, with an operating system of the terminal device, a scenario data package from a target application that is currently running, wherein the scenario data package comprises an identifier and key performance parameters of the target application, wherein the identifier comprises a scenario identifier, wherein the scenario identifier is used for identifying, from a plurality of scenarios of the target application, a scenario that is currently running, wherein the key performance parameters are in association with the scenario that is currently running, and wherein the operating system comprises a management module and a plurality of strategy modules;

determine, with the operating system, a performance improvement strategy for the target application according to the identifier and the key performance parameters, comprising:
- determine, with the management module, the identifier and the key performance parameters in the scenario data package:
- determine, with the management module and from the plurality of strategy modules, a strategy module corresponding to the identifier; and
- determine, with the strategy module, the performance improvement strategy for the target application according to the key performance parameters, comprising:
  - determine, with the strategy module, a parameter type and a parameter numerical range of the key performance parameters:
  - determine, with the strategy module, a performance improvement strategy package corresponding to the parameter type; and
  - determine, with the strategy module and from the performance improvement strategy package, the performance improvement strategy corresponding to the parameter numerical range by using the parameter numerical range as a query identifier; and adjust, with the operating system, allocation of system resources for the target application according to the performance improvement strategy.

6. The terminal device of claim 5, wherein the scenario data package comprises a data format identifier, wherein the at least one computer executable instruction causing the at least one processor to determine, with the management module, the identifier and the key performance parameters in the scenario data package further causes the at least one processor to: determine, with the management module, the identifier and the key performance parameters by parsing the scenario data package according to a data format indicated by the data format identifier.

7. A non-transitory computer readable storage medium, storing at least one computer executable instruction thereon, which, when executed by a computer, is adapted to:

receive, by an operating system of a terminal device, a scenario data package from a target application that is currently running, wherein the scenario data package comprises an identifier and key performance parameters of the target application, the identifier comprising a scenario identifier, wherein the scenario identifier is used for identifying, from a plurality of scenarios of the target application, a scenario that is currently running, wherein the key performance parameters are in association with the scenario that is currently running, and wherein the operating system comprises a management module and a plurality of strategy modules;

determine, by the operating system, a performance improvement strategy for the target application according to the identifier and the key performance parameters, comprising:
- determine, by the management module, the identifier and the key performance parameters in the scenario data package;
- determine, by the management module and from the plurality of strategy modules, a strategy module corresponding to the identifier; and
- determine, by the strategy module, the performance improvement strategy for the target application according to the key performance parameters, comprising:
  - determine, by the strategy module, a parameter type and a parameter numerical range of the key performance parameters:
  - determine, by the strategy module, a performance improvement strategy package corresponding to the parameter type; and
  - determine, by the strategy module and from the performance improvement strategy package, the performance improvement strategy corresponding to the parameter numerical range by using the parameter numerical range as a query identifier; and adjust, by the operating system, allocation of system resources for the target application according to the performance improvement strategy.

* * * * *